(12) United States Patent
Phinney

(10) Patent No.: US 7,988,231 B2
(45) Date of Patent: Aug. 2, 2011

(54) LOW MAINTENANCE CONFIGURATION FOR SLIDING SEATS

(75) Inventor: Randy P. Phinney, Grant, MI (US)

(73) Assignee: American Seating Company, Grand Rapids, MI (US)

( * ) Notice: Subject to any disclaimer, the term of this patent is extended or adjusted under 35 U.S.C. 154(b) by 0 days.

(21) Appl. No.: 12/549,742

(22) Filed: Aug. 28, 2009

(65) Prior Publication Data

US 2010/0052386 A1    Mar. 4, 2010

Related U.S. Application Data

(60) Provisional application No. 61/136,344, filed on Aug. 28, 2008.

(51) Int. Cl.
*A47C 15/00* (2006.01)
*B60N 2/02* (2006.01)

(52) U.S. Cl. ...................... 297/257; 296/65.13

(58) Field of Classification Search ............... 297/257, 297/232, 243; 296/65.13, 65.01
See application file for complete search history.

(56) References Cited

U.S. PATENT DOCUMENTS

| 4,341,415 A * | 7/1982 | Braun et al. ............... 296/64 |
| 4,475,701 A | 10/1984 | Martin |
| 4,723,732 A | 2/1988 | Gorges |
| 4,936,527 A | 6/1990 | Gorges |
| 5,605,368 A * | 2/1997 | Noma et al. ............... 296/64 |
| 6,145,911 A | 11/2000 | Sturt et al. |
| 7,172,155 B2 | 2/2007 | Feist et al. |
| 7,185,850 B2 * | 3/2007 | Callahan et al. ........... 244/118.6 |
| 7,191,981 B2 | 3/2007 | Laib et al. |
| 7,712,829 B2 * | 5/2010 | Park ............................ 297/234 |
| 2008/0164736 A1 * | 7/2008 | Figueras Mitjans .......... 297/257 |
| 2009/0021040 A1 * | 1/2009 | Yamasaki ................ 296/65.13 |

* cited by examiner

*Primary Examiner* — Milton Nelson, Jr.
(74) *Attorney, Agent, or Firm* — Clark & Brody

(57) ABSTRACT

A vehicle has an area capable of seating ambulatory passengers and alternatively receiving a mobility aid, such as a wheelchair. The area provides tracks for mounting at least two movable seats that can be moved to provide space in the area for the mobility aid. The tracks are provided with track covers that reduce maintenance requirements by preventing entry of debris. One of the seats is configured to move further than the other whereby the spacing between the seats after moving to accommodate a mobility aid is less than the spacing of the seats when used by ambulatory passengers. The seat configured to move further has a longer track cover, but the tracks are laterally spaced to avoid engagement between the track covers of the two seats whereby they can be moved to be spaced from each other by a distance less than the length of either of the track covers.

7 Claims, 3 Drawing Sheets

LOW MAINTENANCE CONFIGURATION FOR SLIDING SEATS

CROSS REFERENCE TO RELATED APPLICATION

This application claims the priority of U.S. Provisional Application Ser. No. 61/136,344, which was filed on Aug. 28, 2008.

TECHNICAL FIELD

This invention relates to the art of seating for vehicles such as buses, coaches, and the like. In particular, the invention relates to configurations of sliding seats that move to provide room for receiving passengers in mobility aids, such as wheelchairs.

BACKGROUND OF THE INVENTION

Seating arrangements for vehicles are known where passenger seats are arranged on parallel tracks for movement. The seats in these arrangements typically accommodate two passengers sitting side by side, and there may be two rows of such seats extending longitudinally along the vehicle. The seats that are intended to be moved are mounted on tracks that allow the seats to slide along the tracks to change the spacing between them.

One such configuration used in over-the-road motor coaches mounts a group of the seats on tracks whereby the seats may be moved by sliding them along the tracks to make room for a passenger in a mobility aid, such as a wheelchair. In this configuration, the seats are preferably of the type whereby the seat portions fold upward to reduce the horizontal dimension of the seats and allow them to be moved closer to each other, thus reducing the number of seats that must be moved to accommodate a wheelchair.

One problem with the existing systems is that debris often accumulates in the tracks, which restricts, or even ultimately prevents, movement of the seat along the track. A known solution to this problem is to provide a protective cover that prevents entry of debris into the track and to attach such a cover to the movable seats so that the covers move with the seats to maintain protection of the tracks from entry of debris. This solution requires the placement of stationary covers between the movable covers such that the movable and stationary covers telescope with respect to each other as the seats move.

This known solution is satisfactory only if the minimum distance between the seats sliding on the track is not less than double the length of the movable cover. If the distance a movable seat is to move with respect to another movable seat is greater than double the length of the movable cover, the cover of the one seat will engage the cover of the other seat and prevent further movement of the seat. This places a restriction of the distance by which a seat can move, which effectively precludes use of such covers when the seats are to be moved to a position where they are close together, such as when they are to be moved to provide room for a wheelchair.

SUMMARY OF THE INVENTION

Known seating systems of movable seats with movable track covers that cover the slot in the track for all positions of the movable seat are not satisfactory in those instances where the distance the seats are required to move is large compared to the desired minimum spacing of the seats. This is because the length of a movable cover must be at least the distance that the seat is to be moved, and the minimum spacing is the sum of the lengths of the covers for two adjacent movable seats. The inability to protect the track against entry of debris and yet provide a small distance between seats that are required to move larger distances presents a particular problem in seating systems designed to accommodate wheelchairs or other mobility devices in public transportation. For example, it is often a requirement that a motor coach or city transit bus provide a dual-use area capable of providing both a seating arrangement that accommodates ambulatory passengers seated in the seats and an unobstructed, open area for receiving mobility aids by moving the seats close to each other to maximize the size of the open area.

According to the invention, a dual-use seating area in a vehicle having an area with at least two movable seats for use by ambulatory passengers in a first configuration and an open area for receiving and securing mobility aids in a second configuration is provided by decoupling the tracks that carry the movable seats. Thus, one set of tracks is used for a movable seat that is required to move a larger distance, and a separate set of tracks is used for a movable seat that moves a shorter distance. By this arrangement, the invention provides reduced maintenance of the tracks because movable covers that do not restrict the movement of the seats may still be used.

It will be appreciated from the description below that the tracks carrying seats that move larger distances are essentially interleaved with the tracks carrying the seats that move the shorter distances.

An object of this invention is to provide a reduced maintenance, dual-use seating area with seats that move in separate tracks and provide movement of the seats through larger distances.

It is an object of this invention to provide a configuration of tracks, with seats sliding on the tracks, wherein the seats carry track covers, which allows one seat to move to a position spaced from another seat that is less than the sum of the lengths of the track covers for the two seats.

A further object of the invention is to provide a reduced maintenance, dual use area in a vehicle wherein the area has a fixed seat at one end thereof and two movable seats mounted on tracks and carrying movable track covers and generally aligned with the fixed seat, the movable seats being movable to provide a wheelchair tie-down area when the movable seats are moved to positions close to said fixed seat and closer to each other than the sum of the lengths of the movable track covers.

A still further object of the invention is to provide a reduced maintenance dual use area in a vehicle wherein the area is provided with at least two interleaved tracks with each track having mounted thereon a movable seat with a movable track cover.

DETAILED DESCRIPTION OF THE PREFERRED EMBODIMENT

Figure 1:
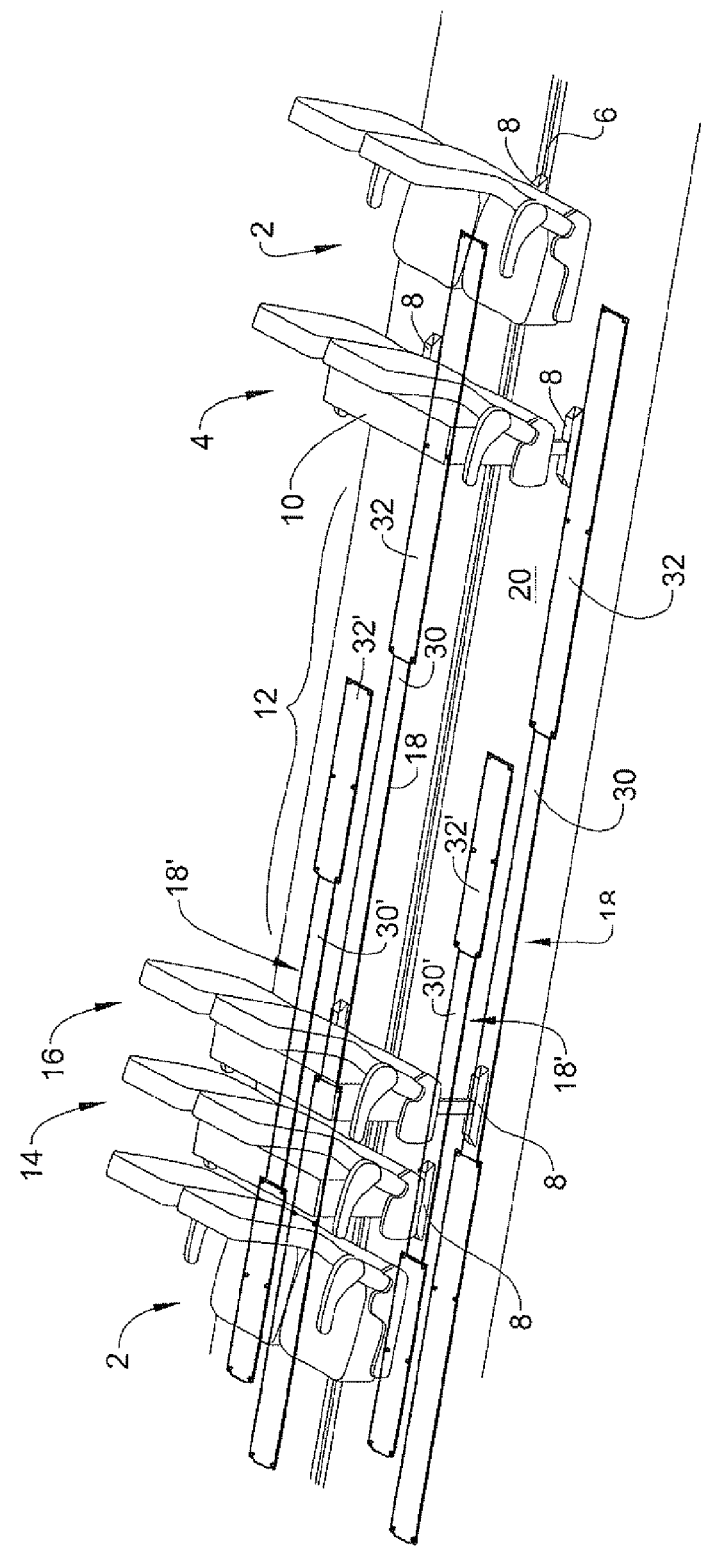
FIG. 1 is a perspective view of a seating configuration in accordance with the invention.

With reference to FIG. 1, a seating configuration according to the invention is illustrated. Such a configuration may be used in transit vehicles, such as motor coaches, buses, railway cars, and the like. A primary purpose of such a configuration is the use of sliding seats that move to provide an area for receiving a passenger in a mobility aid, such as a wheelchair. Thus, the seating area shown in FIG. 1 includes fixed seats 2 and 4. Seats 2 and 4 are known in the art and may be secured to the vehicle in known manner by attachment to the side of the vehicle and to a rail 6 on the floor of the vehicle. For example, each of the seats 2 may include a pedestal 8 that engages the rail 6 on the floor and is also secured to the side of the vehicle (not shown). Seat 4 is secured to the floor by two pedestals 8 and is preferably of the type that includes a folding seat portion 10, known in the art, which folds up to increase the size of the wheelchair area 12.

The seating configuration also includes two movable seats 14 and 16, each of which preferably includes a folding seat portion to allow them to be moved to positions close to each other as shown in FIG. 1.

Figure 2:
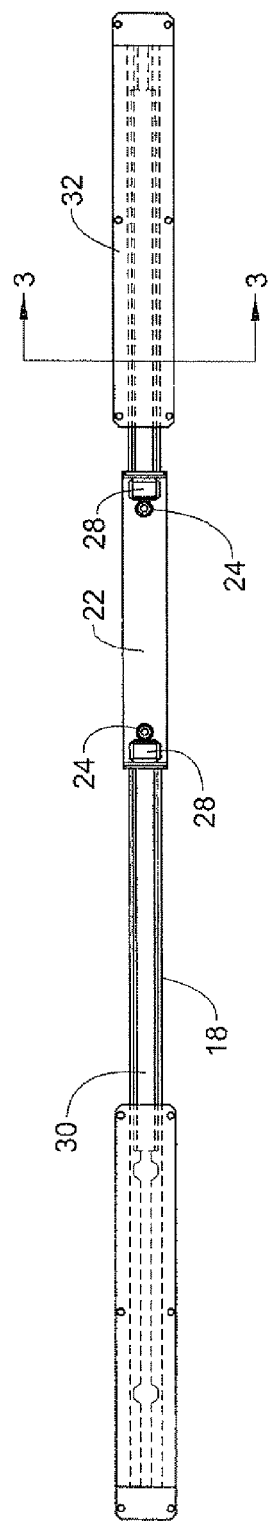
FIG. 2 is a plan view of a sliding track and cover.
Figure 3:
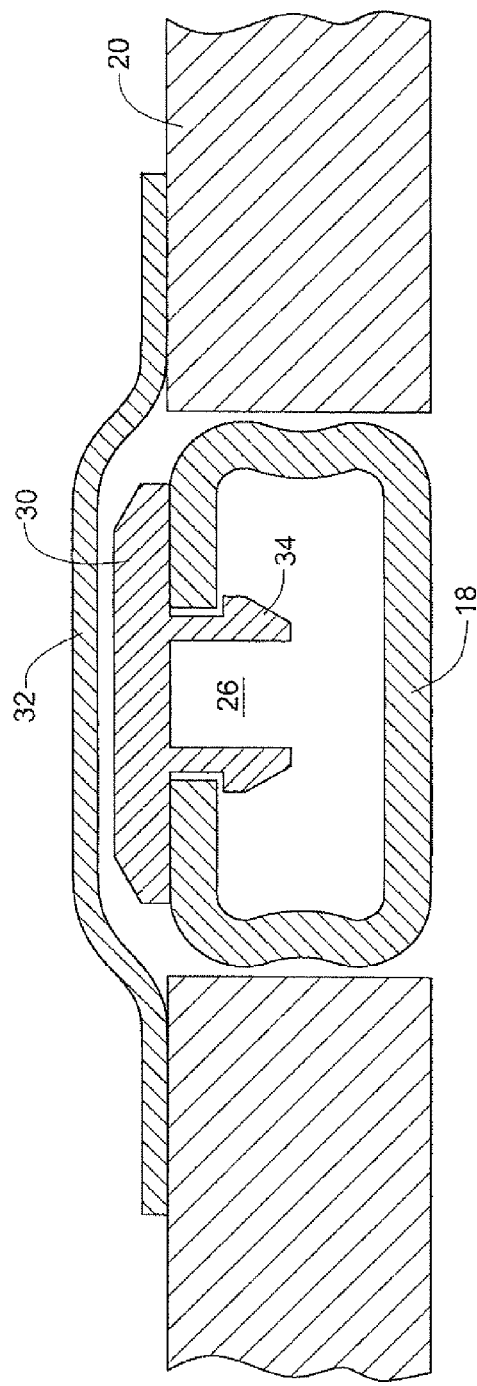
FIG. 3 is a cross section along line 3-3 of FIG. 2.

With reference to FIGS. 2 and 3, a preferred sliding track and cover will be described. FIG. 3 is a cross section taken along line 3-3 of FIG. 2 and shows a track 18 recessed in a floor 20 of the vehicle. The track 18 may be secured to the vehicle by known means, such as by bolting the track to structural elements (not shown) of the vehicle or by welding, clamping, or any other method of secure attachment that will provide the required strength. With reference to FIG. 2, a carrier 22 is provided with attachment means, such as bolts 24, by which a pedestal 8 on a seat 14 or 16 may be secured to the carrier. These bolts may also have heads (not shown) that are received in the track 18 through a slot 26 (FIG. 3) whereby the carrier may move along the slot and yet be retained in the track. The carrier also includes means for facilitating movement of the carrier along the track 18, such as rollers 28. Many structures known in the art may be used to allow the carrier 22 to slide freely along the track to move the seats.

In accordance with one feature of the invention the slot 26 in the track 18 is covered by a movable cover 30 and a fixed cover 32. The movable cover 30 is attached to the carrier 22 for movement with the carrier and is retained in the track by the snap lock 34 illustrated in FIG. 3 or any of a variety of other ways known in the art. An alternative is to provide cover 30 with oppositely facing grooves that receive the opposed edges of the slot 26 to allow the cover 30 to be slid into engagement with track 18 from an open end of the track. The movable cover 30 is attached to a carrier 22 as discussed above to slide within the fixed cover 32 in a telescoping manner whereby the slot 26 remains covered as the seat 16 and the movable cover move. It will be appreciated that the length of a movable cover 30 must be greater than the distance by which the seat is to move and slightly less than the length of a fixed cover, if the slot is to remain covered for all positions of the movable seat.

A problem that arises when providing movable covers is illustrated in FIG. 1.

This problem arises from the fact that the seat 16 must be moved a comparatively large distance to be close to seat 14, which must also be moved to be close to seat 2. Mounting seats 14 and 16 on the same track, as is the case in the prior art, precludes use of movable covers 30 because the movable covers 30 connected to the carrier for seat 16 will engage the movable covers connected to seat 14 and prevent movement of the seats to the closely adjacent positions shown in FIG. 1.

Figure 4:
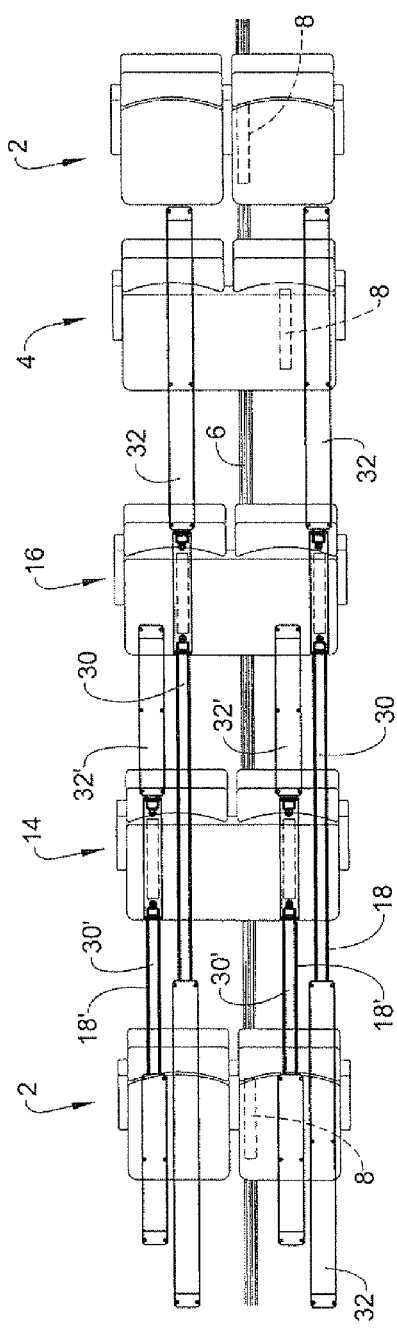
FIG. 4 is a plan view of the configuration of FIG. 1 when the seats are arranged for seating without accommodating a wheelchair.
Figure 5:
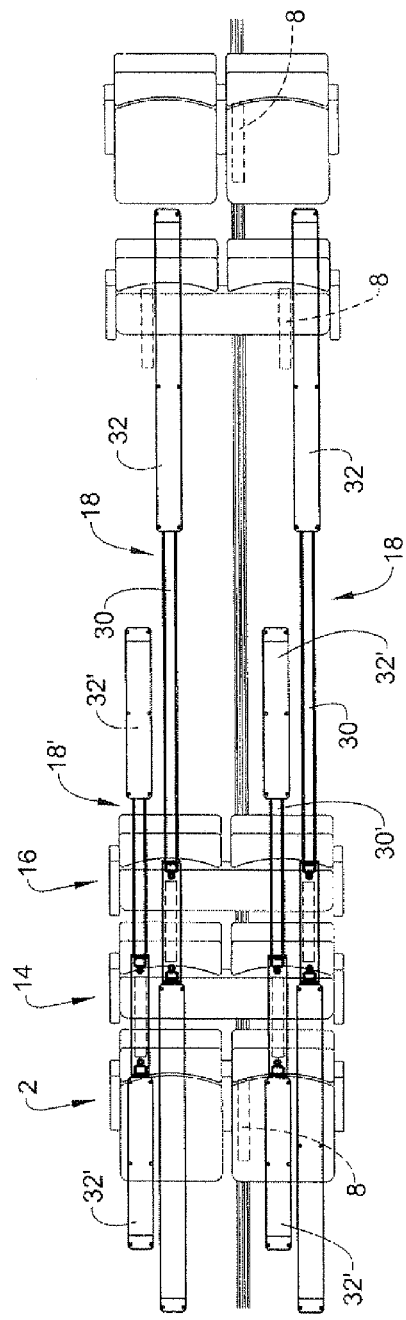
FIG. 5 is a plan view of the configuration of FIG. 1 where the seats are arranged to accommodate a wheelchair.

The solution to this problem illustrated in FIGS. 1, 4 and 5 is a second set of tracks 18', a second set of movable covers 30', and a second set of fixed covers 32'. This second set of tracks and covers is preferably close to the tracks 18 and covers 30, 32 and parallel to them.

By providing separate tracks, movable covers, and fixed covers for seats 14 and 16, respectively, these seats may be moved close to each other as shown in FIGS. 1 and 5 while maintaining the tracks covered to prevent entry of debris.

While the two sets of tracks have been illustrated as being separate, it is within the scope of the invention for two adjacent tracks 18, 18' to be secured together as by bolting or welding whereby attaching one track to the vehicle serves also to attach the other track to the vehicle. As well, the two tracks could be formed as a single extruded or formed element. This would facilitate installation of the two track systems, particularly if the installation is a retrofit, because it would require minimal modification of the existing structure of the coaches or railway cars.

Another approach for a retrofit would be a platform that would overlay the floor in the wheelchair area. The platform would include the covered tracks and attach to the coach floor at least partially by bolting to the existing tracks. An advantage of this is that it would be installed by simply bolting the platform to the existing coach.

Modifications within the scope of the appended claims will be apparent to those of skill in the art.

I claim:

1. A dual use seating area comprising a floor, two movable seats and two tracks, wherein each of said tracks carries a respective one of said movable seats for movement in a first direction toward or away from the other of said movable seats and each of said movable seats carries a movable track cover, a first of said tracks extending in a direction and mounted to said floor, a first of said movable seats mounted on said first track for movement along said first track, a first of said movable track covers having a first length and movable with said first movable seat, a second of said tracks extending substantially parallel to said direction and mounted to said floor, a second of said movable seats mounted on said second track for movement along said second track toward and away from said first movable seat and in general alignment therewith along said direction, a second of said movable track covers having a second length and movable with said second movable seat, wherein said first and second tracks are laterally spaced from each other transverse to said direction, a first track cover fixed with respect to said floor covering at least a portion of said first track and receiving said first movable track cover in cooperative relationship such that said first track remains covered during movement of said first movable seat, a second track cover fixed with respect to said floor covering at least a portion of said second track and receiving said second movable track cover in cooperating relationship such that said second track remains covered during movement of said second movable seat, wherein said second seat may be moved to a position closer to said first seat than the sum of said first and second lengths.

2. A dual use seating area according to claim 1 wherein said second length is greater than said first length.

3. A dual use seating area according to clam 1 wherein said second seat may be moved by a distance greater than that of said first seat.

4. A dual use seating area according to claim 1 wherein said cooperating relationship comprises a telescoping relationship.

5. A dual use seating area according to claim 1 wherein each of said first and second tracks comprises a set of parallel tracks.

6. A dual use seating area according to claim 1 wherein said first track has mounted thereon only said first movable seat and said second track has mounted thereon only said second movable seat.

7. A vehicle comprising a dual use seating area, said dual use seating area comprising two movable seats and two tracks, wherein each of said tracks carries a respective one of said movable seats for movement in a first direction toward or away from the other of said movable seats and each of said movable seats carries a track cover, wherein said two tracks are spaced in a direction transverse to said first direction, and further comprising a stationary seat aligned with said two movable seats in said first direction, wherein the track cover for one of said movable seats is longer than the track cover for the other of said movable seats.

* * * * *